US006499588B1

United States Patent
Eberle (10) Patent No.: US 6,499,588 B1
(45) Date of Patent: Dec. 31, 2002

(54) CONVEYOR SYSTEM

(75) Inventor: Jürg Eberle, Hinwil (CH)

(73) Assignee: IPT Weinfelden AG, Weinfelden (CH)

( * ) Notice: Subject to any disclaimer, the term of this patent is extended or adjusted under 35 U.S.C. 154(b) by 0 days.

(21) Appl. No.: 09/582,463

(22) PCT Filed: Dec. 17, 1998

(86) PCT No.: PCT/CH98/00543

§ 371 (c)(1),
(2), (4) Date: Nov. 6, 2000

(87) PCT Pub. No.: WO99/33720

PCT Pub. Date: Jul. 8, 1999

(30) Foreign Application Priority Data

Dec. 29, 1997 (CH) .............................................. 2978/97

(51) Int. Cl.⁷ ............................................... B65G 41/00
(52) U.S. Cl. .................... 198/861.2; 198/837; 198/683; 104/130.11; 104/108; 246/434
(58) Field of Search ................................ 198/417, 683, 198/837, 861.1, 861.2, 861.4; 246/434; 104/130.11, 108

(56) References Cited

U.S. PATENT DOCUMENTS

| | | | |
|---|---|---|---|
| 3,775,967 A | 12/1973 | Spadini | |
| 3,955,667 A | 5/1976 | Muller et al. | |
| 3,999,730 A | 12/1976 | Gonsalves et al. | |
| 4,339,031 A | * 7/1982 | Densmore | 198/830 |
| 4,620,474 A | * 11/1986 | Eberle | 91/418 |
| 4,838,410 A | * 6/1989 | Gough | 198/417 |
| 5,074,678 A | 12/1991 | Eberle | |
| 5,129,506 A | 7/1992 | Gutov et al. | |
| 5,287,811 A | * 2/1994 | Matsuura et al. | 104/130.03 |
| 5,755,316 A | 5/1998 | Reist | |
| 6,113,273 A | 9/2000 | Eberle et al. | |
| 6,116,810 A | 9/2000 | Eberle | |
| 6,155,405 A | 12/2000 | Siebenmann et al. | |
| 6,186,303 B1 | * 2/2001 | Bernardet | 193/2 R |
| 6,196,377 B1 | * 3/2001 | Brown | 198/409 |

FOREIGN PATENT DOCUMENTS

| | | |
|---|---|---|
| CH | 623 283 | 5/1981 |
| CH | 667 636 A5 | 10/1988 |
| DE | 40 14 069 A1 | 3/1992 |
| DE | 196 04 999 A1 | 9/1996 |
| EP | 0 628 109 A1 | 12/1994 |
| GB | 1 585 368 | 3/1981 |

* cited by examiner

Primary Examiner—Chirstopher P. Ellis
Assistant Examiner—Mark A. Deuble
(74) Attorney, Agent, or Firm—Rankin, Hill, Porter & Clark LLP (57) ABSTRACT

A conveying system for conveying items along a conveying line (1, 2) includes a guide device (3) extending along the conveying line and at least one conveying element (5) movable along the conveying line and guided by the guide device (3). The guide device (3) and conveying element (5) are designed for conveying the items substantially independent of gravity. For selectable connection of the conveying line to a plurality of connecting points (A.1–A.3) the conveying system includes, connected to a invariable conveying line region (1) with a fixedly mounted guide device, a variable conveying line region (2) in which the guide device (3) is reversibly bendable and twistable. For bending and/or twisting the guide device and for supporting the guide device in a bent and/or twisted position necessary for a specific connection, a drivable connector (8) is provided. The variable conveying line region (2) may be an end region of the conveying line.

14 Claims, 5 Drawing Sheets

CONVEYOR SYSTEM

BACKGROUND OF THE INVENTION

FIELD OF THE INVENTION

The invention is in the field of conveying technology and relates to a conveying system for conveying material along a conveying line. Such a conveying system comprising guide means extending along the conveying line and at least one conveying element that is movable along the conveying line and guided by the guide means and driven by a suitable drive. The guide means and conveying element are designed for conveyance of items substantially independent of gravity. At least one conveying element being movable along the conveying line with or without the material while being guided by the guide means and being driven by a suitable drive. The conveying line can be designed such that conveying element and material to be conveyed can have different spatial positions in different locations of the conveying line.

Conveying systems with a guide means and with at least one conveying element movable along the guide means for which conveying system the spatial position of the conveying element and the material to be conveyed can be different in different locations of the conveying line are, for example, known as comprising a conveying chain running in a guide channel and carrying grippers protruding from the channel, wherein each gripper grips an item (material to be conveyed) and supports it during conveyance. This kind of system is, in particular, known from its application in conveyance of streams of printed products in substantially all possible spatial positions.

Similar systems are known that use, instead of a transport chain with a plurality of links, a plurality of conveying elements that are independent of each other and driven individually. Further known are systems combining characteristics of both systems mentioned above by using a plurality of conveying elements being connected to each other but with distances between each other which are, to a limited degree, variable.

For conveyance to be substantially independent of gravity the guide means of the named conveying systems are, for example, designed to form a cage or channel in which a guided part of the conveying element is enclosed (guided part within guiding part) or to be surrounded by a part of the conveying element (guiding part within guided part). The conveying elements are grippers that are designed for gripping and supporting items to be conveyed.

Conveying systems for conveyance in particular of printed products along freely selectable conveying lines and substantially independently of gravity, are described in the following publications CH-623283 (F086) CH-592562 (F070), EP387318 (F270).

The guide means of conveying systems as described above are usually mounted along a conveying line being predetermined by the conveying function. For simple mounting of the guide means along curved regions of conveying lines bendable guide means have been described, e.g. in the patent applications CH-2917/96 (F444) and CH-801/97 (F453) or in publication EP-0628109 (Richter).

Usually switch points are used for connecting the end of a conveying line defined by a fixedly mounted guide means to a selected one of a plurality of further conveying lines or to a selected one of a plurality of different installations. Such switch points, for example, consist of a pivoting guide piece having a restricted length and being hingedly connected to the end of the fixedly mounted guide means. This pivoting guide piece can be pivoted such that its distal end facing away from the fixedly mounted guide means connects the fixedly mounted guide means to one or another of the further conveying lines or installations.

Such switch points restrict the arrangement and design of possible connecting points to be connected with the fixedly mounted guide means within narrow limits. The connecting points must have an exactly defined distance from the end of the fixedly mounted guide means. The connecting points must all lie in the pivoting plane of the pivoting guide piece and they must all be designed such that they can take over conveying elements and/or conveyed items with the same orientation defined by guide means of the conveying line further upstream and the switch point. The same is valid for switch points according to CH-558285 (F61) which comprise a bendable guide piece instead of a pivoting guide piece.

Selectable connection of a conveying system, as described above, to one of two connecting points is, in most, cases realized by a fixedly mounted guide ramification and a controllable switching element (e.g. flap in a canal ramification) with two positions. The switching element in each one of the two positions forces movement of a passing conveying element to one of the two guide means branching away from the ramification point.

SUMMARY OF THE INVENTION

An object of the invention is to create a conveying system with a guide means extending along a conveying line and with at least one conveying element, which conveying system is selectively connectable to one of a plurality of connecting points. The inventive conveying system is to restrict to a considerably lesser degree than known conveying systems the conditions regarding spatial position of the connecting points and spatial position of the conveyed items. The term "connecting point" is to be understood as an area in which either the at least one conveying element (e.g. together with conveyed items) passes from the guide means of the regarded conveying system to a further guide means (connection to a further, similar conveying system) or in which the conveyed items are transferred from the at least one conveying element of the regarded conveying system (connection to a further different or similar conveying system or to a different installation with transfer of conveyed items).

The inventive conveying system comprises, following an invariable region of conveying line with a fixedly mounted guide means, a variable conveying line region. The variable conveying line region comprises a guide piece, which is reversibly bendable and twistable such that the end of the guide piece, by predetermined bending and/or twisting, is selectively connectable to one of a plurality of connecting points. The variable conveying line region is e.g. the end region of a conveying line. The bendable and twistable guide piece is bent and/or twisted in a predetermined manner and held in the bent and/or twisted position with the aid of a drivable connecting means which e.g. acts on the distal end of the bendable and twistable guide piece.

In further accordance with the present invention, the variable region of conveying line does not have to be an end region of a conveying line. An intermediate region of a conveying line can also comprise a bendable and twistable guide piece and thus act as a connecting region. The bending and twisting capacity of the guide means in the variable conveying line region is to be matched to the at least one conveying element such that conveying line curves created by bending and/or twisting have a bending radius which is at least large enough for the curves to be passed by the conveying element without problems.

The length of the reversibly bendable and twistable guide piece in the variable conveying line region is advantageously matched to the mechanical stability of the guide means such that the form of the guide piece is defined by its connection with the at least one fixed guide means and the effect of the connecting means and such that it has (advantageously without further devices) a stability sufficient for operation, i.e. is self-supporting.

If the guide means in a conveying line end region is bendable, the end of the conveying line can be coupled to connecting points at different distances from a fixedly mounted region, arranged in space in any manner. Thus, for different connections, the guide means is bent more or less, in different directions or forming a loop or loops. If the guide means in a conveying line end region is twistable, the spatial position of the conveying element and thus of the conveyed items can be matched to specific requirements of each individual connecting point.

BRIEF DESCRIPTION OF THE DRAWINGS

These and further features of the present invention will be apparent with reference to the following description and drawings, wherein.

DETAILED DESCRIPTION OF THE PREFERRED EMBODIMENTS

Figure 1:
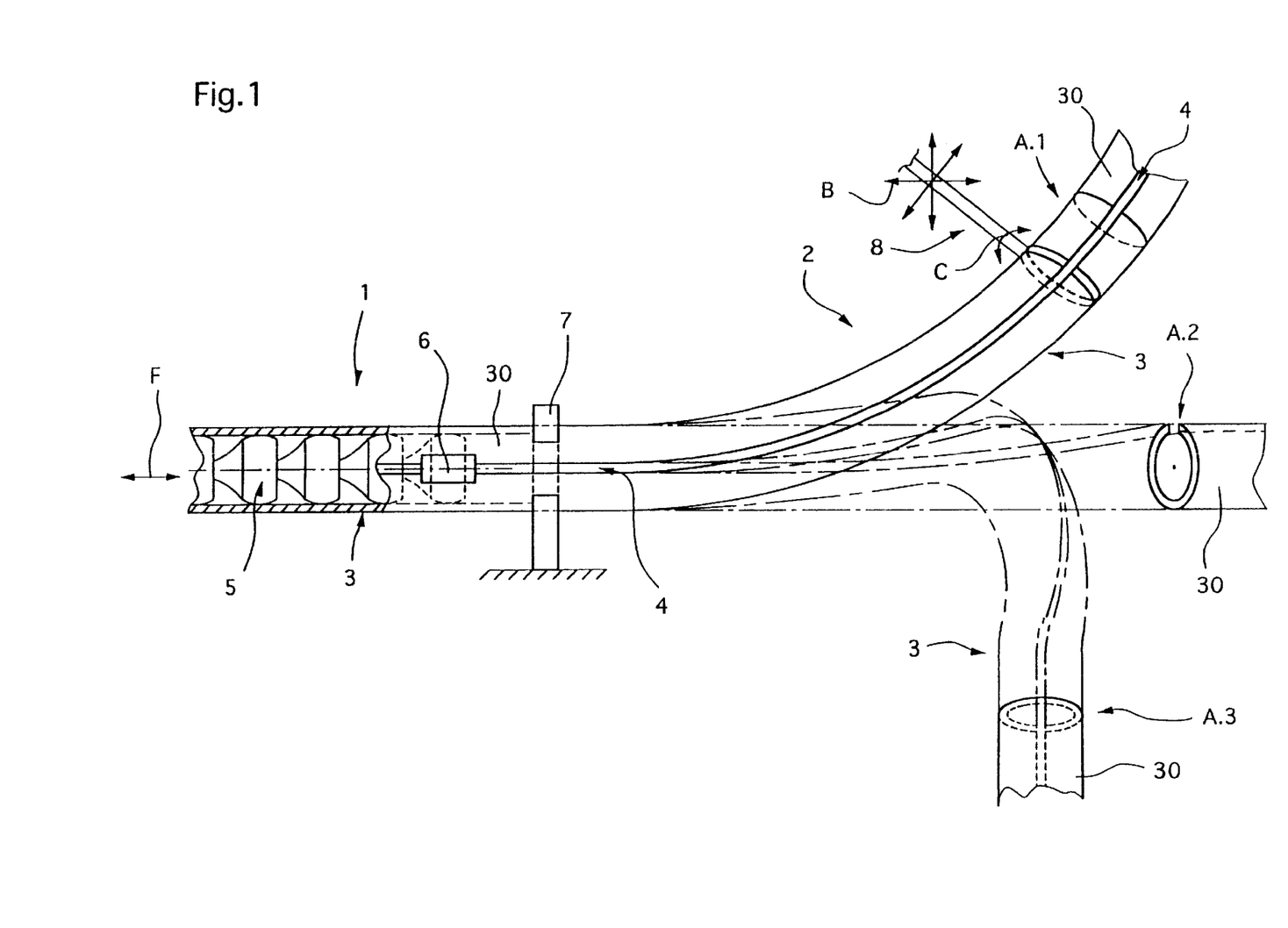
FIG. 1 shows an exemplified embodiment of the inventive conveying system, the variable conveying line end region of which is selectively connectable to a plurality of similar conveying systems.

FIG. 1 very diagrammatically shows a first exemplified embodiment of the inventive conveying system. In this embodiment the connections to further similar conveying systems are designed such that the at least one conveying element is movable across the connecting point and is guided by the guide means of the further similar conveying system beyond the connecting point. FIG. 1 shows of the inventive conveying system only one end of an invariable conveying line region 1 with a fixedly mounted guide means and a variable conveying line end region 2 comprising a reversibly bendable and twistable guide piece which is selectably connectable to three different connecting points A.1 to A.3.

The guide means 3, at least in the variable conveying line end region 2, substantially consists of a guide channel 30 (e.g. guide tube) being reversibly bendable and twistable and comprising a continuous longitudinal slot 4. The conveying element consists of a chain 5 which can be driven by pushing or pulling and which comprises at least one gripping device 6 protruding from the longitudinal slot 4 for gripping one item to be conveyed. For conveyance the chain 5 is driven in the corresponding direction (double arrow F) by a suitable drive (not shown).

In the invariable conveying line region 1 the guide channel 30 (or generally the guide means 3) can in principle be bendable and twistable or not. However, in this region 1 the guide channel 30 is fixedly mounted such that the course of the conveying line and the local spatial orientation of the longitudinal slot 4 remain fixed (invariable). This is indicated in FIG. 1 by means of a shackle 7, which connects the guide channel 30 with a stationary support.

Open ends of similar guide channels 30 with longitudinal slots 4 are provided as connecting points A.1 to A.3. As can be seen from FIG. 1, the spatial position of these channel ends is freely selectable within wide limits and the position of longitudinal slot 4 on these channel ends which defines in the connecting point the spatial position of the gripping device 6 and of a conveyed item is independent of the slot position in the invariable conveying line region 1 and for each connecting point 4 is freely selectable within a wide range.

In order to connect the distal end of the variable conveying line end region 2 to connecting point A.1 the bendable and twistable guide means 3 need only be bent and not twisted, because the longitudinal slot 4 has the same spatial orientation where the guide means is fixedly mounted as in connecting point A.1.

In order to connect the distal end of the variable conveying line end region 2 to connecting point A.2 the bendable and twistable guide means need not be bent but twisted, because the connection A.2 is arranged on a straight extension of the invariable conveying line region 1 and at a distance corresponding to the length of the bendable and twistable guide piece. Its longitudinal slot 4 is offset by ca. 90° relative to the longitudinal slot of the fixedly mounted guide means.

In order to connect the distal end of the guide piece of the variable conveying line end region 2 to connecting point A.3 the guide means 3 must be bent and twisted by ca. 180°.

For changing connections, drivable connecting means 8 are provided (shown in a very schematic manner). These connecting means 8 are advantageously connected to the distal end of the guide piece of the variable conveying line region. The connecting means are equipped such that they can move this distal end to each of the connecting points A.1 to A.3 (double arrows B), such that they can twist the distal end around its own axis (double arrow C), and such that they can hold the distal end in each bent and/or twisted position corresponding to any one of the connecting points. The design of the connecting means 8 is to a high degree dependent of the arrangement and the equipment of the connecting points A.1 to A.3, but all the same can be realized without problems by one skilled in the art, for example, with a lever system and a combination of suitably controlled linear motors.

When operating the chain shown in FIG. 1 as a single conveying element 5, care must be taken that before a change of connection the chain does not reach across the connecting point. Its front end must, therefore, at least be withdrawn into the bendable and twistable guide piece or the chain links must be separated in the area of the connecting point before the connection is changed.

In publication DE-19604999 (F409) a system is described, which comprises a guide means as illustrated in FIG. 1 and a conveying element in form of a chain being bendable in all directions and applicable in pulling and pushing operation. In this kind of system, the end of a conveying line as shown in FIG. 1 can be integrated as a switch point function.

Conveying elements, which are independent of each other, can also be moved in a guide means 3, as shown in FIG. 1, e.g. elements as described in patent application CH-2338/96 (F441).

Figure 2:
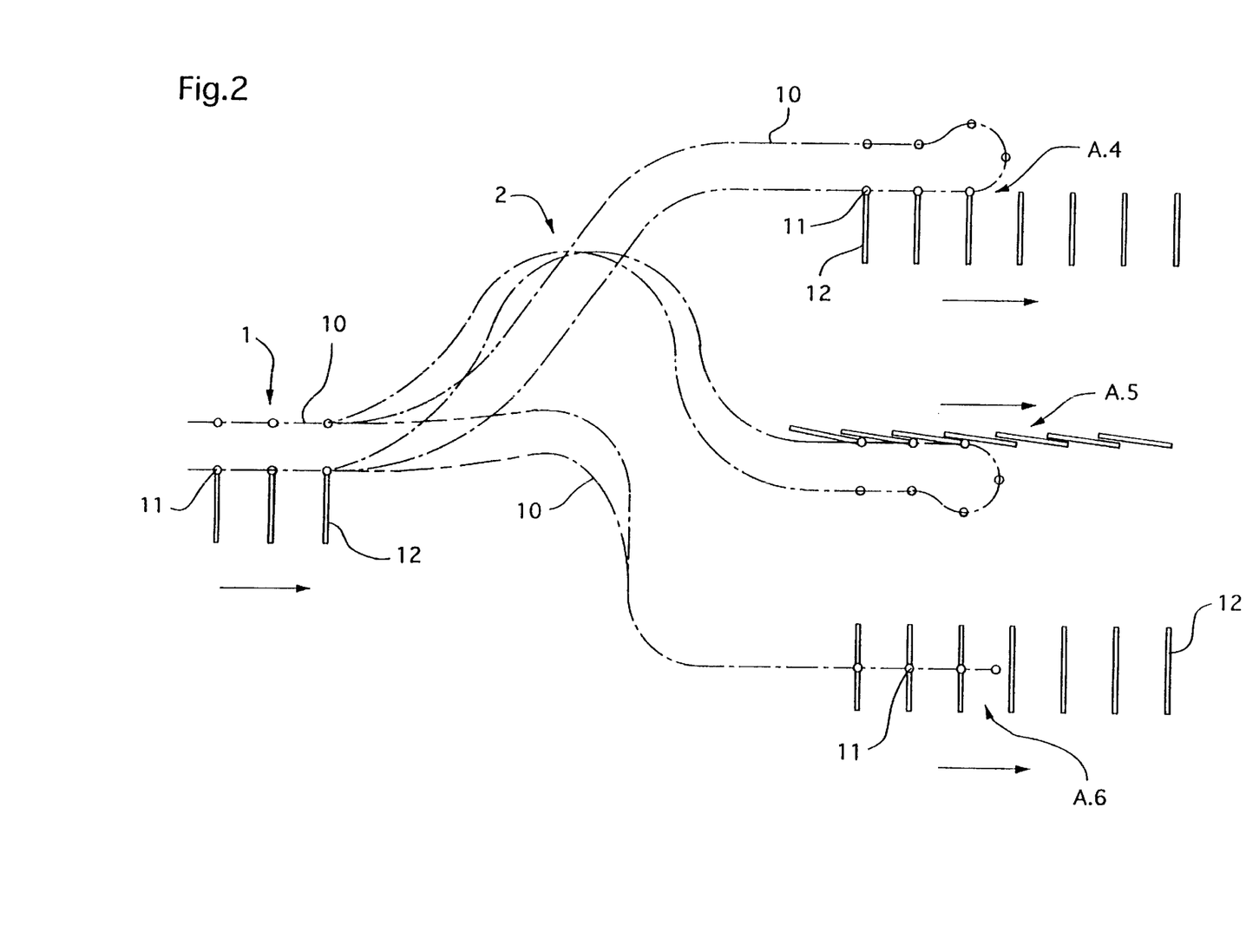
FIG. 2 shows a further, exemplified embodiment of the inventive conveying system the variable conveying line end region of which is selectively connectable to a plurality of different or similar conveying systems or different installations (transfer of conveyed items)

FIG. 2 shows a further, exemplified embodiment of the inventive conveying system. This embodiment is especially suitable for connections to conveying systems different from the looked at system or to other installations. For example, it is suitable for connecting points that are passed by the conveyed items only (transfer of items) but not by the conveying element or elements. Again, only one end of the conveying line with an invariable conveying line region 1 and a variable conveying line end region 2 is shown. The conveying system comprises a double guide means (not shown, e.g. a double channel according to FIG. 7), of which the one part defines the conveying path of an endless chain 10 (diagrammatically shown as broken line) and the other part defines the return path of this chain. The distal end of the variable conveying line region is at the same time a point in which the chain 10 is redirected by ca. 180°.

The items to be conveyed are gripped and held while being conveyed by grippers 11 arranged on the chain links and protruding from the guiding channel. Of the grippers 11 only a few are shown as small circles and the conveyed items are shown as narrow rectangles representing e.g. printed products seen in parallel to their main surfaces.

In a connecting point as illustrated by FIG. 2 the conveyed items are transferred from the transport element or gripper 11 respectively to a further conveying element of a further conveying system or to a different installation (not shown), i.e. passage of the connecting point always means transfer for the conveyed items.

In FIG. 2 three connecting points A.4 to A.6 are shown schematically, whereby the further conveying means or other installations, which take over the conveyed items are not shown and thus are not further defined. It can, however, be seen from FIG. 2 that the three connecting points require different spatial position of the conveyed items 12. Therefore, the items must be handed over in different spatial positions, depending on the connection.

At the end of the fixedly mounted guide means (invariable conveying line region 1) the conveyed items 12 are conveyed in a hanging manner, i.e., the guide means of the conveying path is arranged below the guide means of the return path. This arrangement is also required for connecting point A.4. In order to connect to A.4 the guide means must thus only be correspondingly bent but not twisted. In connecting point A.5 the items are to be handed over in lying position, i.e. the guide means for the return path is to lie underneath the guide means of the conveying path. The reversibly bendable and stable guide, means of the variable conveying line region 2 must therefore not only be bent for handing over but also be twisted by 180°. For handing over at connecting point A.6 the bendable and twistable guide means must be bent and twisted by 90°.

In the embodiment of the inventive system according to FIG. 2 again, the variable conveying line region 2 can also be arranged in a loop. A loop even of a relatively large bending radius makes it possible to serve different connecting points all lying relatively near to the end of the invariable conveying line region.

FIGS. 3 to 7 show, in more detail, exemplified embodiments of reversibly bendable and twistable guide means 3 applicable in a conveying system according to the invention.

Figure 3:
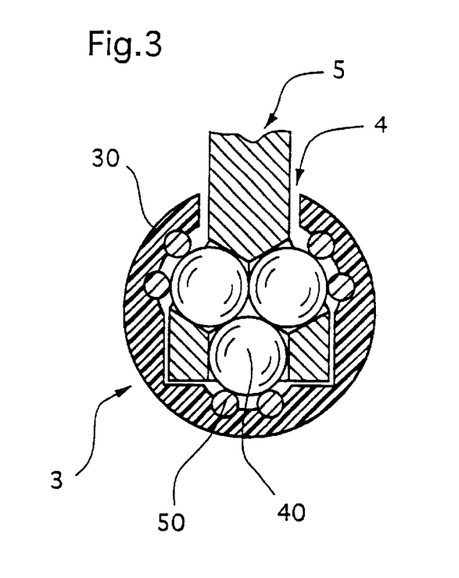
FIGS. 3 to 7 show exemplified embodiments of bendable and twistable guide means usable in conveying systems according to the invention.

FIG. 3 shows, in a cross section, a guide means 3 and a conveying element 5 of a conveying system as described in publication EP-387318 (F270) and in the patent application CH-2917/96 (F444). The guide means 3 comprises a guide channel 30 with a longitudinal slot 4 similar to the guide channel a schematically shown in FIG. 1. For guiding the internally running conveying element 5 which is a rolling body and comprises groups of three balls 40, rails 50 are arranged within guide channel 30. The rails are fixed to the inner surface of the guide channel e.g. by positive engagement. These rails, which may extend in parallel to each other over the whole length of the channel 30, are advantageously made of an indelible material, e.g. of a suitable metal and have e.g. a circular cross section.

The guide channel 30 with rails 50 is reversibly bendable and twistable and therefore applicable in a variable conveying line region if it consists of a deformable, advantageously elastically deformable material and if the rails 50 can move to an at least limited degree in the direction of the conveying line, i.e. in parallel to the channel axis relative to the channel. Rails 50 must also be bendable. If they have a circular cross section they must not necessarily be twistable as long as their fixing in channel 30 allows a rotation in relation to channel 30.

Figure 4:
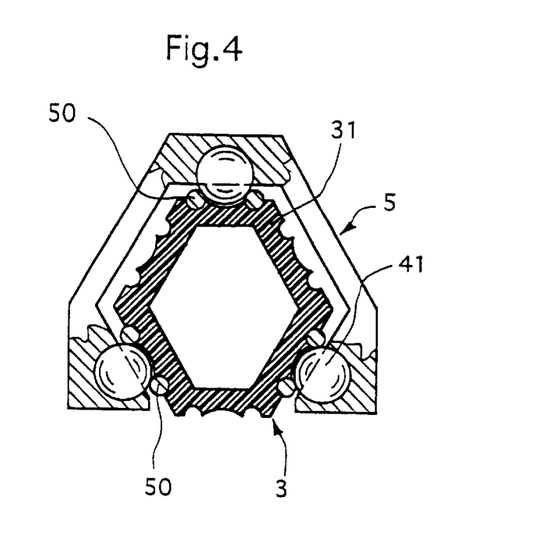

FIG. 4 shows a further embodiment of a guide means 3 for an inventive conveying system. The guide means serves for guiding an externally running conveying element 5. The guide means comprises a reversibly bendable and twistable guide rod 31, which may be hollow. Rails 50 for rolling bodies 41 of conveying element 5 are arranged on the outside of guide rod 31. For guide rod 31 and rails 50 the same conditions are valid as described above regarding guide channel 30 and rails 50 as illustrated by FIG. 3.

Figure 5:
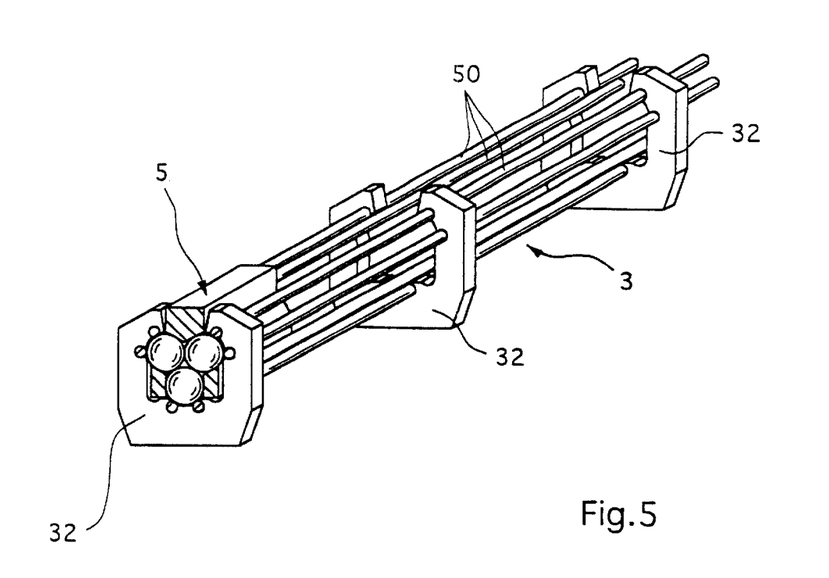

FIG. 5 shows a further guide means 3, which corresponds regarding function to guide channel 30. The reversibly bendable and twistable channel 30 is, however, replaced by a plurality of distanced channel elements 32. The distanced channel elements 32 can be displaced relative to each other due to the flexibility of rails 50 and, thus, form a reversibly bendable and twistable channel without having to be bendable and twistable themselves.

Figure 6:
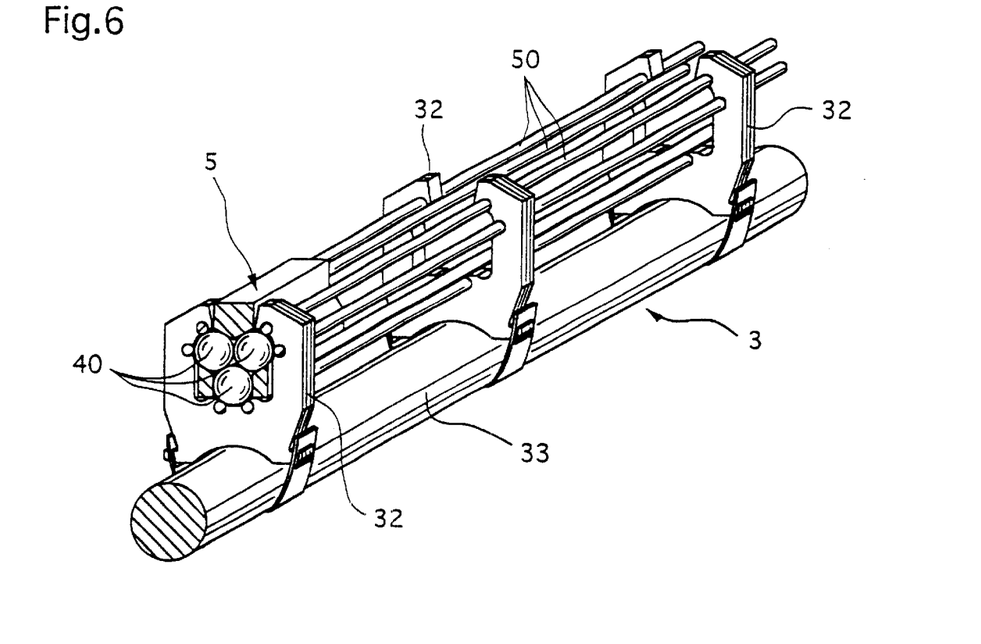

FIG. 6 shows a further guide means 3, which regarding function again corresponds to the guide channel of FIG. 3 and which, in the same way as the guide channel of FIG. 5, comprises channel elements 32. The channel elements 32 are mounted on a reversibly bendable and twistable carrier element 33. It is easily possible to mount a second channel on carrier element 33 which channel consists of rails 50 and channel elements 32 and thus to realize the "double channel" according to FIG. 2.

Of course, it is possible also to replace the guide rod according to FIG. 4 with rod elements (in analogy to the channel elements 32), which rod elements are combined by means of rails to form a reversibly bendable and twistable guide means.

Figure 7:
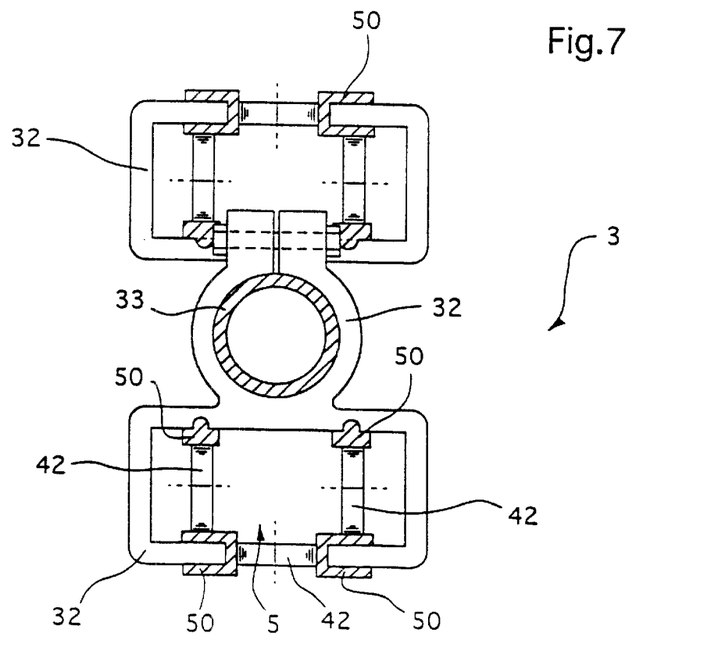

FIG. 7 shows a further guide means 3 in the form of a double guide channel, which is applicable in a system according to FIG. 2. The guide means again consists of a reversibly bendable and twistable carrier element 33 and of two guide channels mounted on it, the guide channels comprising channel elements 32 and rails 50. A chain, which rolls on rails 50 with rolls 42, e.g. serves as conveying element.

Figure 8:
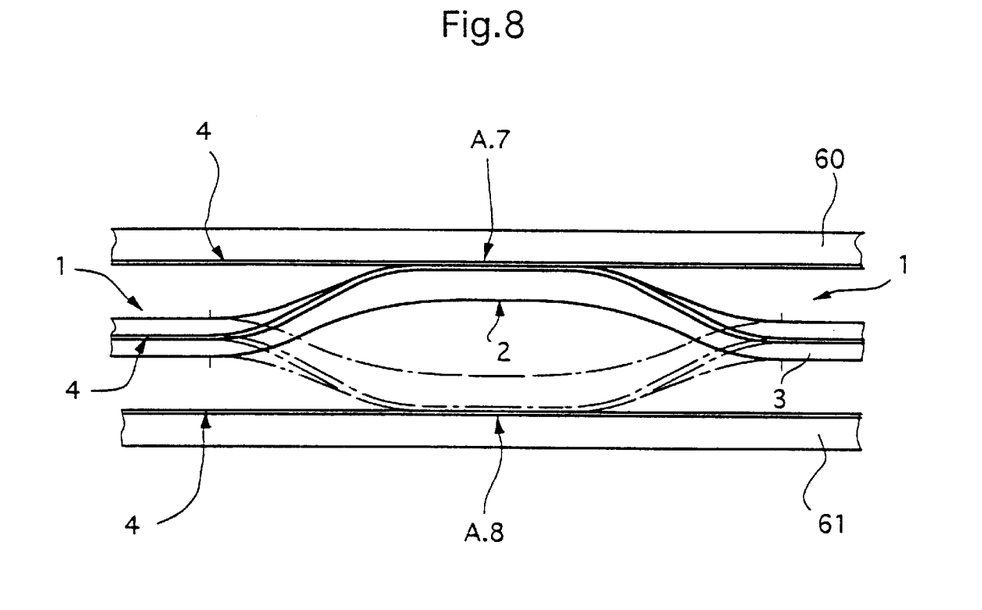
FIG. 8 shows a further exemplified embodiment of the inventive conveying system not comprising a variable conveying line end region but a variable conveying line intermediate region.

FIG. 8 shows an exemplified embodiment of the inventive conveying system with a variable conveying line intermediate region 2, which connects two invariable conveying line regions 1 on both sides. The guide means 3 is shown as guide channel with a longitudinal slot 4. Depending on the position of the variable conveying line region 2 it serves for item transfer at connection points A.7 or A.8, by being connected to one of two further conveying lines 60 or 61 respectively, whereby the position of the longitudinal slot 4 is to be adapted to the position of the same longitudinal slot of the guide means of conveying systems 60 and 61 in the indicated manner by means of twisting guide means 3.

Figure 9:
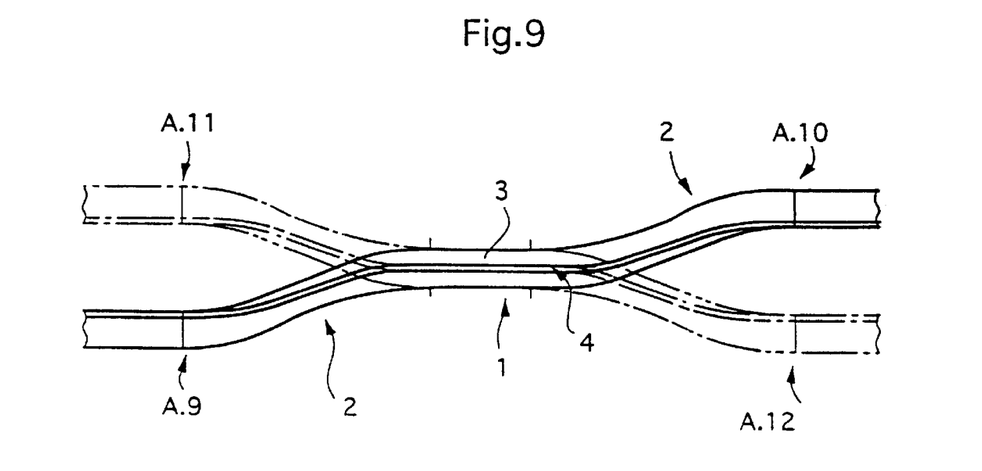
FIG. 9 shows a further exemplified embodiment of the inventive conveying system with two variable conveying line end regions.

FIG. 9 shows a further exemplified embodiment of the inventive conveying system, which is derived from the embodiment according FIG. 1. The conveying line comprises an intermediate, invariable region 2. The corresponding guide means 3 is again shown as guide channel with longitudinal slot 4 and the connecting points A.9 to A.12 as distal ends of similar guide means. With the aid of selectable connection of the one variable conveying line region 2 to connecting points A.9 or A.11 and the other variable conveying line region 2 to connecting points A.10 or A.12, four different connection variants are possible. (A.9–A.10: shown in unbroken lines; A.11–A12: shown in broken lines; A.9–A.12 and A.11–A.10: not shown).

The shown embodiments of the inventive conveying system are examples and are not intended to limit the invention. Combinations of characteristics other than the shown ones can easily be derived from the description and the Figures and lead to further, possible embodiments of the inventive conveying system.

What is claimed is:

1. A conveying system for conveyance along a conveying line (1, 2), said conveying system comprises guide means (3) extending along the conveying line and at least one conveying element (5) being movable along the conveying line guided by the guide means and driven by a suitable drive, wherein said guide means and conveying element are designed for conveyance of items substantially independent of gravity, wherein said conveying line comprises at least one invariable conveying line region (1) with fixedly mounted guide means and, connected to an end of the invariable conveying line region (1), at least one variable conveying line region (2) with reversibly bendable and twistable guide means (3) and wherein, for selective connection of the variable conveying line region (2) to one of a plurality of connecting points (A.1–A.3, A.4–A.6, A.7–A.8, A.9–A.12), driven connecting means (8) are provided for selectively bending and/or twisting the reversibly bendable and twistable guide means (3) of the variable conveying line region (2).

2. The conveying system according to claim 1, wherein bendability and twistability of the guide means (3) of the variable conveying line region (2) is designed such that, on bending and/or twisting, the bending radii of the conveying line are matched to conveying properties of the at least one conveying element (5).

3. The conveying system according to claim 1, wherein the bendable and twistable guide means (3) of the variable conveying line region (2) in a connected condition is fixed in its end regions and is self-supporting.

4. The conveying system according to claim 1, wherein the guide means (3) is, at least in the variable conveying line region (2), a reversibly bendable and twistable guide channel (30) with a longitudinal slot (4).

5. The conveying system according to claim 4, wherein the guide means (3) additionally comprises a plurality of rails (50) running in parallel to each other and being, at least to a limited degree, movable in the direction of the conveying line relative to one of the guide channel (30) and the guide rod (31).

6. The conveying system according to claim 5, wherein the guide channel or guide rod is formed by a plurality of distanced channel elements (32) or rod elements.

7. The conveying system according to claim 1, wherein the guide means (3), at least in the variable conveying line region (2), is a reversibly bendable and twistable guide rod (31).

8. The conveying system according to claim 7, wherein the reversibly bendable and twistable guide means (3) comprises a reversibly bendable and twistable carrier element (33) on which a guide channel or a guide rod is mounted.

9. The conveying system according to claim 8, wherein, on the reversibly bendable and twistable carrier element (33), two guide channels or guide rods are mounted and wherein, on one distal end of the variable conveying line region (2), the guide channel or the guide rod changes direction.

10. The conveying system according to claim 9, wherein the variable conveying line region (2) is a conveying line end region and an end of said conveying line end region is connectable to one of another conveying system and a different installation.

11. The conveying system according to claim 7, wherein the guide means (3) additionally comprises a plurality of rails (50) running in parallel to each other and being, at least to a limited degree, moveable in the direction of the conveying line relative to one of the guide channel (30) and the guide rod (31).

12. The conveying system according to claim 11, wherein the guide channel or guide rod is formed by a plurality of distanced channel elements (32) or rod elements.

13. The conveying system according to claim 1, wherein the variable conveying line region (2) is a conveying line end region and a distal end of said conveying line end region is connectable to a similar conveying system such that the at least one conveying element (5) is movable across the connecting point.

14. The conveying system according to claim 1, wherein the variable conveying line region (2) is an intermediate conveying line region connected to invariable conveying line regions (1) on both sides.

* * * * *

UNITED STATES PATENT AND TRADEMARK OFFICE
CERTIFICATE OF CORRECTION

PATENT NO. : 6,499,588 B1
DATED : December 31, 2002
INVENTOR(S) : Eberle

It is certified that error appears in the above-identified patent and that said Letters Patent is hereby corrected as shown below:

Column 1,
Line 54, delete "CH-623283 (F086) CH-592562 (F070), EP387318 (F270)"
and insert -- GB 1,585,368, US 3,955,667, and US 5,074,678 --.
Line 61, delete "CH-2917/96 (F444) and CH-801/97 (F453)" and insert
-- US 6,113,273 and US 6,116,811 --.

Column 2,
Line 17, delete "CH-558285 (F61)" and insert -- US 3,775,967 --.

Column 5,
Line 1, delete "DE-19604999 (F409)" and insert -- US 5,755,316 --.
Line 11, delete "CH-2338/96 (F441)" and insert -- US 6,155,405 --.

Column 6,
Line 8, delete "EP-387318 (F270)" and insert -- US 5,074,678 --.
Line 9, delete "CH-2917/96 (F444)" and insert -- US 6,113,273 --.

Signed and Sealed this

Eighth Day of July, 2003

JAMES E. ROGAN
*Director of the United States Patent and Trademark Office*